United States Patent

[11] 3,628,371

| [72] | Inventors | Alvin G. Moore<br>Cumberland;<br>Wilfred C. Schuemann, Rawlings Heights,<br>Rawlings, both of Md. |
|---|---|---|
| [21] | Appl. No. | 830,827 |
| [22] | Filed | June 5, 1969 |
| [45] | Patented | Dec. 21, 1971 |
| [73] | Assignee | Hercules Incorporated<br>Wilmington, Del. |

[54] TESTING EXPEDIENT FOR FLUID JET DEFLECTION-TYPE INSTRUMENT
4 Claims, 4 Drawing Figs.

[52] U.S. Cl. .................................................. 73/1 D,
    73/516
[51] Int. Cl. ................................................ G01p 21/00
[50] Field of Search ........................................ 73/505,
    515, 516, 1; 137/81.5; 33/205.6 T

[56] References Cited
UNITED STATES PATENTS

| 3,295,355 | 1/1967 | Fisher et al. ................ | 73/517 |
| 3,201,999 | 8/1965 | Byrd ............................ | 73/515 |
| 3,310,985 | 3/1967 | Belsterling et al. .......... | 73/515 |
| 3,324,730 | 6/1967 | Bowles ........................ | 73/515 |
| 3,500,690 | 3/1970 | Schuemann ................. | 73/516 |

Primary Examiner—Richard C. Queisser
Assistant Examiner—Herbert Goldstein
Attorney—William F. Smith ABSTRACT: An instrument wherein the deflection of a fluid jet, induced for example by the angular movement of the instrument, produces a signal proportional to the deflection, and particularly a testing expedient in such an instrument for testing the instrument while at rest to determine whether it is functioning correctly, the testing expedient comprising a selectively actuatable means for deflecting the fluid jet a predetermined amount whereby the instrument will, if functioning properly, produce a predetermined output signal.

PATENTED DEC 21 1971

3,628,371

ALVIN G. MOORE
WILFRED C. SCHUEMANN
INVENTORS

BY William F Smith

AGENT

TESTING EXPEDIENT FOR FLUID JET DEFLECTION-TYPE INSTRUMENT

This invention relates to a fluid jet deflection-type instrument, that is, an instrument wherein a fluid jet is adapted to be deflected from a centered condition relative to a sensing means, the magnitude and the direction of the deflection being measured to produce an output signal to indicate the magnitude and direction of the force or influence inducing the deflection.

An example of a fluid jet deflection-type instrument is the angular movement-sensing forming the subject matter of copending U.S. patent application Ser. No. 632,239 filed Apr. 20, 1967. In this device, the deflection of a laminar flow fluid jet from a centered condition relative to the sensing means is produced by the lateral movement of the sensing means during the interval of time that an increment of fluid is in transit in the jet from the nozzle to the sensing means, and the amount and direction of the deflection is an indication of the rate and the direction of the angular movement. A further example of a fluid jet deflection-type instrument is the gravity or acceleration-sensitive instrument included in the subject matter of copending U.S. patent application Ser. No. filed.

In a fluid jet deflection-type instrument such as that disclosed in the above-noted application Ser. No. 623,239, the sensing means comprises a pair of thermistors spaced from the jet nozzle and spaced apart relative to the axis of the jet to position them on opposite sides of the centerline of the jet in the area radially of the axis of the jet where there is substantially linear variation in the jet velocity. Thus, when the jet is deflected relative to the thermistors, the increase or decrease of the jet velocity over each of the thermistors is directly proportional to the magnitude of the jet deflection. In an instrument wherein the jet nozzle is about one-eighth of an inch in diameter, the jet velocity is about 100 inches per second, and the spacing of the origin of the jet at the exit of the nozzle to the sensing means is about one-half inch, the total deflection of the jet over the full scale of the instrument would be about 1 millimeter.

In use, when the instrument is at rest, that is, when it is not subjected to the influence to which it is designed to respond, for example, angular movement or acceleration, the output signal is zero. This of course cannot be distinguished from the condition that exists if the instrument were malfunctioning such as by a failure of the pump means whereby there is not jet traversing the thermistors. At the same time, because of the physical location or mounting of the instrument, such as in an airplane, it may not be convenient to test the same to determine whether it is functioning properly and that the absence of an output signal is due to the at-rest condition of the instrument and not to a malfunctioning of it. In accordance with this invention, there is provided a simple and reliable testing expedient to determine quickly and easily whether the instrument is functioning properly.

In accordance with this invention, the above objects have been achieved by means for selectively imposing a predetermined deflection to the jet. The instrument responds to such a deflection in the same manner as it responds to such a deflection in the same manner as it responds to a deflection of the jet imposed by the influence for which it is designed to respond. Inasmuch as a predetermined deflection of the jet produces a predetermined output signal, the functioning of the instrument can be checked by actuating the jet deflection means and comparing the output signal thus produced with the predetermined output signal that should be produced with the measured deflection of the jet. The jet deflection means may comprise, for example, an obstruction imposed in the path of the fluid flow to the nozzle. Other jet deflection expedients which may in themselves be known may also be suitable. The jet deflection means may be manually actuated or may include means for actuating the same remotely.

The present invention is hereinafter described with reference to the accompanying drawings, in which.

Figure 1:
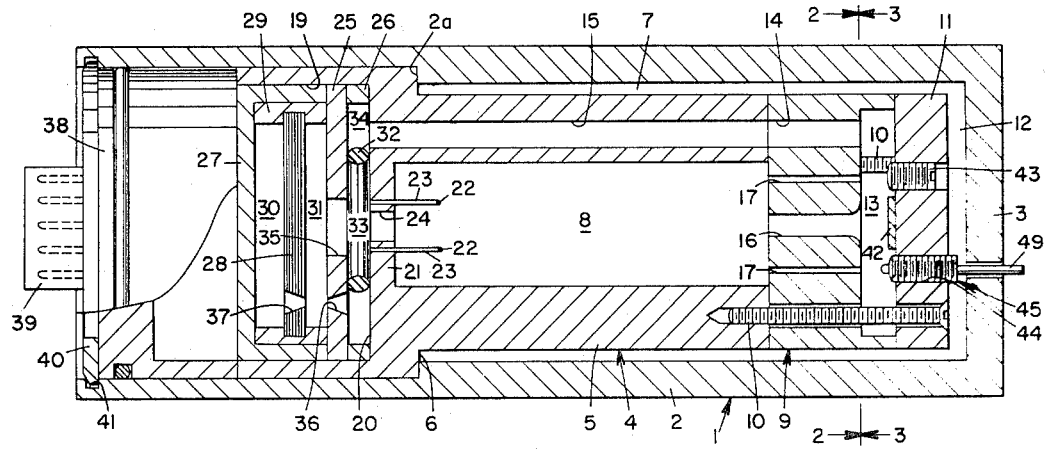
FIG. 1 is a sectional view longitudinally of an instrument embodying the present invention.
Figure 2:
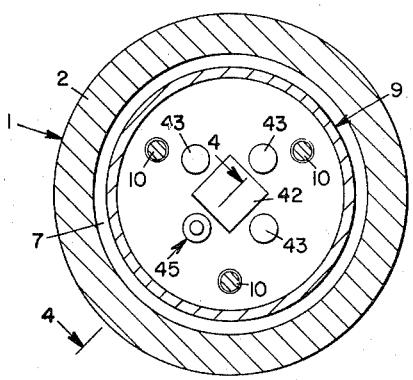
FIG. 2 is a transverse sectional view taken substantially on the line 2—2 of FIG. 1.

With reference to the drawings, there is illustrated a fluid jet deflection-type instrument comprising a housing 1 including a cylindrical sidewall 2 having internally thereof a shoulder 2a and closed at one end by an end wall 3. A unit 4 is inserted into the housing 1 from the open end thereof, the unit 4 comprising a body 5 having a shoulder 6 that is adapted to be seated against the shoulder 2a for positioning the unit 4 endwise of the housing 1. From the shoulder 6 outwardly to the open end of the housing 1, the body 5 has an external diameter that is adapted to be received within the sidewall 2 with a relatively close fit for supporting the body 5. The body 5 is preferably secured within the housing 1 as by an adhesive applied at these opposed supporting surfaces. Inwardly of the housing 1 from the shoulder 6, the external diameter of the body 5 is smaller than the internal diameter of the housing whereby the portion of the body 5 is supported in cantilever fashion relative to sidewall 2 to provide an annular space 7 therebetween.

The body 5 has a cylindrical jet chamber 8 extending inwardly axially thereof from the end adjacent the end wall 3 of the housing 1. A nozzle member 9 is secured to the nozzle end of the body 5 by screws 10 that extend through an end plate 11 and the nozzle member 9 and are threaded into the body 5. The screws 10 are arranged radially outwardly of the body 5 from and about the periphery of the jet chamber 8, and there are preferably three of the screws 10 equally spaced angularly about the axis of the unit 4. The external diameter of the nozzle member 9 and end plate 11 is comparable to that of the adjacent portion of the body 5 whereby they are spaced inwardly from the internal surface of the housing 1 to continue the annular space 7. The body 5, nozzle member 9, and end plate 11 are dimensioned lengthwise relative to the housing 1 to space the end plate 11 from the end wall 3 to provide a clearance space 12 therebetween.

Figure 3:
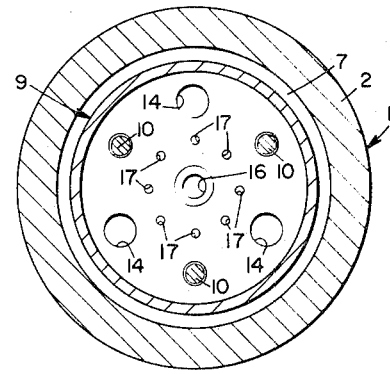
FIG. 3 is a transverse sectional view taken substantially on the line 3—3 of FIG. 1.

The nozzle member 9 is formed with a cavity extending axially inwardly from the end thereof adjacent to the end plate 11 to provide a plenum chamber 13 between the bottom of the cavity and the adjacent face of the end plate 11. Fluid is supplied to the plenum chamber 13 by a plurality of fluid inlets in the form of bores 14 in the nozzle member 9, each of which inlets 14 is open at one end into the plenum chamber 13 and is connected at the other end to a bore 15 aligned axially with the inlet 14, the bores being formed endwise of the body 5 and spaced radially from the axis of the unit 4 outwardly of the jet chamber 8. There are preferably three of the inlets 14 and bores 15 equally spaced angularly about the axis of the unit 14 and bores 15 equally spaced angularly about the axis of the unit 4 intermediate the screws 10, as can be seen in FIG. 3.

A nozzle 16 is formed in the nozzle member 9 with the inlet end thereof open into the plenum chamber 13 and the output end thereof open into the jet chamber 8. The nozzle 16 is arranged to direct a fluid jet endwise of the jet chamber 8 substantially along the axis thereof, or in other words, is aligned axially with the jet chamber 8. A plurality of vents 17 are formed through the nozzle member 9 between the plenum chamber 13 and the jet chamber 8. The vents 17, which are disclosed and claimed in U.S. patent application Ser. No. 632,238, now Pat. No. 3500,690 dated Mar. 17, 1970 surround the nozzle 16 and function to introduce fluid into the jet chamber 8 in the space surrounding the jet, thereby preventing a cyclical or counterflow of fluid in the jet chamber 8 in the space surrounding the jet, which counterflow is induced by aspiration by the jet. At the same time, by supplying fluid from the same source to both the jet and the jet-surrounding space in the jet chamber 8, there is substantially eliminated any temperature or density differential between the fluids which would make the device gravity or acceleration sensitive.

The body 5 is provided with a cavity 19 extending axially inwardly thereof from the end opposite from the nozzle end of the jet chamber 8. The cavity 19 terminates at a bottom wall 20 that is spaced from the bottom wall of the jet chamber 8 by a partition 21. The sensing means of the instrument comprises a sensing portion in the form of a pair of thermistors 22 and a bridge circuit which is not shown but which may be the same as that disclosed in the above noted patent application Ser. No. 632,239. The thermistors 22 are secured as by an adhesive to the free ends of a pair of glass rods or posts 23 mounted and adhesively secured in bores in the partition 21. The thermistors 22 are substantially centered relative to the axis of the nozzle 16 and are spaced apart a distance that is gauged relative to the cross section of the jet at this point whereby they are disposed on opposite sides of the center of the jet discharged from the nozzle 16. When the jet is deflected, the fluid passing over the thermistors will increase or decrease, depending upon whether the center of the jet is moved toward or from the respective thermistor. The partition 21 is also provided with a plurality of exhaust ports 24, only one of which is shown in FIG. 1, which ports 24 are disposed symmetrically relative to the thermistors 22 for exhausting the fluid from the jet chamber 8 with a minimum or turbulence. The posts 23 serve to space the thermistors 22 from the partition 21 so that the jet will flow smoothly relative thereto.

A pump means is disposed in the cavity 19 of the body 5, which pump means includes an orifice plate 25 that is positioned in space relation relative to the bottom wall 20 of the cavity 19 by a ringlike spacer 26. The pump means also includes a cup-shaped endpiece having an end wall 27 that closes the end of the cavity 19, and a pump plate 28 that is mounted between and in spaced relation to the end wall 27 and the orifice plate 25 by a spacer 29. The pump plate 28 is mounted in an internal groove in the spacer 29 which, for assembly purposes, may be resilient so that it can be deformed over the edge of the pump plate 28. The spacer 29 also serves to hold the pump plate 28 without confining it too severely and thus inhibiting the vibration thereof. By way of example, the spacer 29 may be made of a relatively hard rubber. The various elements are preferably secured adhesively in their assembled relation.

The space between the end wall 27 and the pump plate 28 constitutes a pump chamber 30 while the space between the pump plate 28 and the orifice plate 25 constitutes an intake chamber 31. The space between the orifice plate 25 and the bottom wall 20 of the cavity 19 is separated by a divider in the form of an O-ring 32 into a centrally located exhaust chamber 33 and an annular pressure chamber 34 surrounding the same. The orifice plate 25 is provided at the center thereof with an exhaust opening 35 interconnecting the exhaust chamber 33 and the intake chamber 31. The orifice plate 25 is also provided with an outlet orifice 36 adjacent the periphery thereof that interconnects the intake chamber 31 and the pressure chamber 34. The pump plate 28 is provided with a pump orifice 37 that is directly opposed across the inlet chamber 31 from the outlet orifice 36 of the orifice plate 25.

The illustrated pump means, which is like that forming the subject matter of U.S. patent application Ser. No. 830,830, filed June 5, 1969, comprises a pair of laminated disclike piezoelectric crystals which are adapted to be energized by voltages of opposite polarity whereby when the one crystal is expanded, the other crystal is contracted. The pump plate 28 is thus caused to buckle with the contracting crystal at the concave side and the expanding crystal at the convex side. When the polarity of the voltage on the crystals is reversed, the pump plate 28 buckles in the opposite direction. The crystals are adapted to be energized by an oscillator (not shown) which periodically reverses the voltage to the crystals preferably at or about the resonant frequency of the crystal, which with crystals having a diameter of about 1 ½inches is about 1,700 cycles per second. For smaller crystals the resonant frequency would be correspondingly higher.

As the pump plate 28 buckles to enlarge the volume of the pump chamber 30, fluid is drawn into the pump chamber from the intake chamber 31 through the pump orifice 37. As the pump plate 28 buckles to decrease the volume of the pump chamber 30, a charge of air is expelled through the pump orifice 37. This charge of air has sufficient energy to carry across the intake chamber 31 and through the outlet orifice 36 into the pressure chamber 34. The orifices 36 and 37 are preferably oriented angularly intermediate a pair of the bores 15. Thus, the charge of air impinges on a blank face at the wall 20 and is dispersed throughout the pressure chamber 34 to move uniformly through the bores 15 and inlets 14 into the plenum chamber 13. From the plenum chamber 13, the fluid passes through the nozzle 16 and vents 17 into the jet chamber 8. AFter passing endwise of the jet chamber 8 over the thermistor 22, the fluid is exhausted through the ports 24 into the exhaust chamber 33 and from the chamber 33 through the exhaust opening 35 into the chamber 31 from which it is drawn by the pump and recirculated.

The open end of the housing 1 is closed by an end cap 38 including an electrical connector 39, which cap 38 is secured in the housing 1 by an expansion ring 40 that cooperates with a groove 41 internally of the housing 1. The electrical component of the instrument, that is, the thermistors 22 and pump plate 28, are wired to the connector 39 which provides for connecting them externally to an appropriate electrical circuit which may be for example of the type disclosed and claimed in the above noted application Ser. No. 632,239. Briefly, this circuit comprises bridge circuit for heating each of the thermistors to a temperature at which the resistance of the thermistors will produce equilibrium in the respective bridge circuit and the power supplied to each of the thermistors will be sufficient only to replace the heat that is lost by dissipation. When the jet is deflected, the rate at which the heat is dissipated from each of the thermistors increases or decreases, depending upon whether the axis of the jet is moved toward or away from the respective thermistor. When the thermistor cools, the resistance thereof increases so that the bridge becomes unbalanced and more power is delivered to the thermistor to reheat it to the equilibrium temperature of the bridge. Conversely, when the cooling rate of the thermistor is decreased, the temperature of the thermistor increases and its resistance decreases, so that its bridge circuit is unbalanced and the power to the thermistor is reduced until its temperature falls to its equilibrium temperature at the new cooling rate. By comparing the bridge voltages of the two bridges, the cooling rate of the jet on the two thermistors, and thus the lateral position of the jet relative to the two thermistors can be determined. The reaction time of the circuit is almost instantaneous to provide a continuous and immediate indication of the jet position.

In an angular movement-sensing instrument, deflection of the jet occurs when the thermistors are displaced laterally during the time that a particular increment of jet fluid is in transit from the nozzle to the thermistors from their positions at the time the increment of jet fluid was discharged by the nozzle. Thus, this increment of jet fluid will engage the thermistors in a noncentered condition, with the amount and direction of the displacement from the centered condition indicating the direction and the angular rate of the turn. Deflection of the jet occurs in a gravity or acceleration-sensing instrument by imparting buoyancy, either positive or negative, to the jet relative to the surrounding fluid in the jet chamber 8. Such a buoyancy may be provided by the means forming the subject matter of U.S. patent application Ser. No. 830,826, filed June 5, 1969. Briefly, the means therein disclosed comprises a minute electrical heater 42, which may be a conventional patch-type strain gauge, that is secured to the inner face of the end plate 11 and in the area opposed to the inlet of the nozzle 16. The fluid flowing from the inlets 14 into the plenum chamber 13, and thus to the nozzle 16, passes over the heater 42 while the fluid to the vents 17 does not significantly pass over the heater 42. Thus the temperature of the nozzle fluid is raised a finite amount relative to that of the vent fluid and the jet will have a predetermined buoyancy relative to the surrounding fluid. The jet will therefore be deflected by acceleration in the plane of sensitivity, that is, in a direction at right angles to the jet in a plane defined by the axis of the nozzle 16 and the two thermistors 22.

In order to achieve a linear response in the reading or signal produced, it is necessary that the thermistors 22 be disposed symmetrically relative to the axis of the jet in its nondeflected condition and be disposed in the area radially of the jet in which there is substantially linear variation in the jet velocity. As pointed out in the above noted application Ser. No. 632,239, the thermistors are thus located in a plane of sensitivity that includes the axis of the jet and on opposite sides of the jet axis, with each of the thermistors centered in an area ranging from about 40 to 70 of the jet diameter from the jet axis. If the jet were not initially centered in this manner, the range of one or both of the thermistors in the jet profile may extend outside the area of linear variation in the jet velocity. The same result may occur if the jet axis were above or below the plane of sensitivity and the lateral dimension of the jet in the plane of sensitivity thereby reduced.

A noncentered condition of the jet relative to the thermistors 22 may result for example from deviation of the jet from the designed jet axis, which may in turn be caused by manufacturing variations in the lateral position of the nozzle 16 or the angularity of it relative to the axis of the jet chamber 8. There may also be variations in the position of the posts 23 laterally relative to the axis of the jet chamber 8, or, in the parallelism of the axis of the posts 23 relative to the axis of the jet chamber, or in the location of the thermistors 22 on the end of the posts 23. All of the above variations may be within reasonable manufacturing tolerances and may be prohibitively expensive to eliminate in manufacture.

The illustrated means for correcting any deviations of the jet from a centered condition relative to the sensing means forms the subject matter of U.S. Pat. application Ser. No. 830,828, filed June 5, 1969. This means comprises a plurality of flow obstructions that are adjustably inserted into the flow path of the fluid through the plenum chamber 13 to the nozzle 16 and, particularly, a plurality of screws 43 threaded through bores 44 in the end plate 11 and a single testing element 45 that is also threaded through a bore 44 in the end plate 11 and, in outline, is substantially similar to the screws 43. There are preferably three of the screws 43 which, together with the testing element 45, provides a total of four flow obstructions each of which is disposed with the axis thereof substantially parallel to the axis of the nozzle 16. The four flow obstructions are arranged equally spaced both angularly about the axis of the nozzle 16 and radially therefrom, and are also spaced radially from the axis of the nozzle 16 a distance that is not significantly greater than the radial spacing of the vents 17 and are spaced angularly between a pair of vents 17 so that when they are turned down to project the ends thereof into the plenum chamber 13, their ends will constitute obstructions in the flow path of the fluid through the plenum chamber 13 to the nozzle 16 but will not materially obstruct fluid flow to the vents 17. Adjusting the screws 43 and testing element 45 so that the ends thereof project more or less into the plenum chamber alters the dynamics of the flow or fluid feed to the nozzle 16, thereby deflecting the jet relative to the axis of the jet chamber 8.

Figure 4:
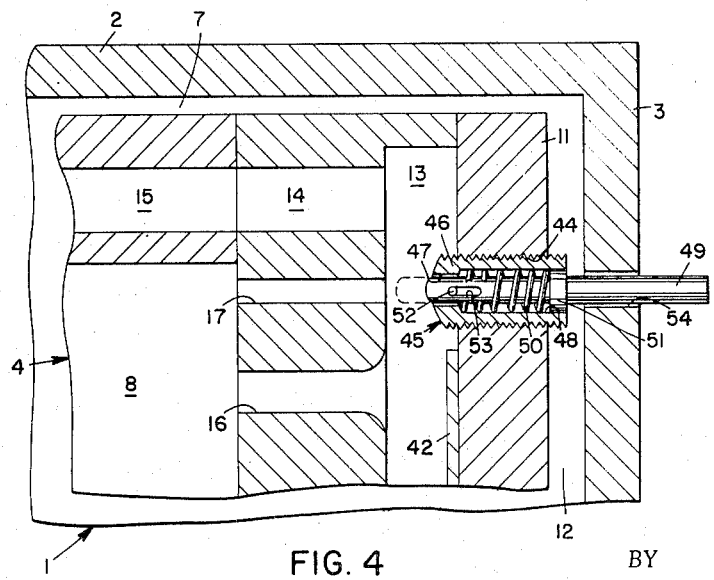
FIG. 4 is a fragmentary sectional view taken substantially on the line 4—4 of FIG. 2.

As illustrated in FIG. 4, the testing element 45 comprises a body portion in the form of a screw 46 threaded into the bore 44 of the end plate 11 in the same manner as the screw 43, and it is also adapted to be turned down like the screws 43 to project the leading end thereof into the plenum chamber 13 to adjust the jet into a centered condition relative to the thermistors 22. The screw 46 is elongated to extend into the space 12 and is provided with a central or axial bore 47 and a counterbore 48 that is open at the end adjacent to the end wall 3. A plunger 49 is mounted in the bore 47 for endwise sliding and is biased in the direction toward the end wall 3 by a compression spring 50 in the counterbore 48 and coiled about the same, the spring acting between the bottom of the counterbore 48 and a collar 51 on the plunger 49 adjacent to the open end of the counterbore 48 and adapted to slide endwise of the counterbore 48. Endwise movement of the plunger 49 relative to the screw 46 is limited by a pin 52 secured diametrically of the screw 46 at the leading end thereof and extending through an elongated slot 53 endwise of the plunger 49. The plunger 49 is elongated to extend through a bore 54 in the end wall 3 to the exterior of the housing 1 whereby the plunger 49 may be moved endwise manually against the bias of the spring 50.

The plunger 49 is normally biased into its inoperative position which is to the right and into the position illustrated in full lines in FIG. 4. When it is desired to check the instrument to determine whether it is functioning properly, the plunger 49 is forced inwardly manually against the bias of the spring 50 into its operative position which is determined by engagement of the end of the slot 53 against the pin 52. At this time, the leading end of the plunger 49 extends into the plenum chamber 13 as illustrated in the dotted line position in FIG. 4. The leading end of the plunger 49 thus obstructs the flow of the fluid along one radial path through the plenum chamber 13 to the intake end of the nozzle 16, thereby unbalancing the fluid feed to the nozzle and deflecting the jet discharged from the nozzle. The amount of the deflection can be calibrated at a time when the instrument is known to be functioning properly to indicate a particular output signal. By way of example, when the plunger 49 is depressed in an angular rate-sensing instrument, the jet may be deflected an amount equal to the deflection that occurs when the instrument is turned at a rate of one-half of one degree per second. Thereafter, the functioning of the instrument can be quickly and easily checked by depressing the plunger 49. If the instrument is then functioning properly, it will produce a reading or output signal equivalent to that produced by a turn of one-half degree per second. When the plunger 49 is released, the spring 50 returns the same to its inoperative position.

The unit 4 is normally assembled and finally close in a control atmosphere so that it will contain a predetermined volume of fluid. The assembled unit 4 is then placed on a test stand at which temporary test connections are made to the leads to the pump plate 28 and to the thermistors 22. The unit 4 is then operated without deflection of the jet while the screws 43 and 46 are adjusted to center the jet relative to the thermistors 22 and to bring the axis thereof into the plane of sensitivity. When the adjustment is completed, the screws 43 and 46 are locked in their adjusted position for example by an epoxy resin deposited in the bores 44 above the screws 43 and about the screws 46. The unit 4 is then inserted into the housing 1 with the plunger 49 projecting through the bore 54 in the end wall 3 and is secured in position by an adhesive applied between the external surface of the body 5 outwardly of the shoulder 6 and the opposed internal surface of the sidewall 2 of the housing 1. The electrical connections are then made to the connector 39 and the end cap 38 is inserted into the housing and secured by the ring 40. The unit is then adapted for use by connecting the same by the connector 39 to an external circuit for supplying power to the unit and for comparing the heat dissipation of the thermistors 22.

By way of example, an instrument in accordance with this invention may comprise a nozzle 16 that is one-eighth of an inch in diameter. The thermistors 22 may be spaced from the nozzle a distance that may be for example as little as one-half an inch, the actual spacing being a function primarily of the jet velocity and the desired range or sensitivity of the instrument. With the thermistors spaced for example a distance of about one-half inch from a one-eight inch nozzle, the thermistors are spaced apart a distance of about one-eighth of an inch to place them on opposite sides of the centerline of the jet in the area radially of the jet where there is substantially linear variation in the jet velocity. The posts 23 in such an arrangement are preferably about one-tenth of an inch high. The fluid pressure at the plenum chamber 13 is about 0.0005 p.s.i., which will maintain a jet velocity with air of about 100 inches per second and a flow rate of less than 2 cubic feet per hour. The Reynolds number of the fluid at the nozzle is between 400 and 1,000 to provide laminar flow in the jet.

The testing device 45 that is herein illustrated and described is only for purposes of illustration and it will be obvious that other expedients may be used for deflecting the jet, for example, a pin inserted radially into the nozzle 16 or a deflector that is adapted to engage or act upon the jet after it is discharged from the nozzle 16. It is also contemplated that the jetdeflecting device may be operated remotely for example, with a plunger such as the plunger 49, by a solenoid (not shown) mounted on the end wall 3 and surrounding the plunger 49. A solenoid for remotely actuating the plunger could also be built into the screw 46 with the electrical connections therefor brought out through the connector 39, thereby avoiding the protruding end of the plunger 49 that projects from the end wall 3.

What we claim and desire to protect by Letters Patent is:

1. A fluid jet deflection-type instrument comprising:
   a body having a jet chamber,
   nozzle means having a nozzle for directing a fluid jet endwise of said jet chamber,
   sensing means disposed in said jet chamber remote from said nozzle and substantially symmetrically relative to the axis thereof and adapted to respond to deflection of a fluid jet from a centered condition relative thereto,
   said body having exhaust means beyond said sensing means from said nozzle for exhausting fluid from said jet chamber,
   means for supplying fluid under pressure to said nozzle including a plenum chamber having the intake end of said nozzle opening into the same and fluid inlet means for introducing fluid into said plenum chamber substantially symmetrically about the axis of the said nozzle,
   and means for testing the instrument while at rest to determine whether it is functioning properly comprising a testing element extending into said plenum chamber between said nozzle and said inlets, said element being movable between an operative position and an inoperative position for obstructing the flow of fluid through said plenum chamber to said nozzle thereby deflecting the jet from a centered condition relative to said sensing means when in said operative position, and means for moving said testing element selectively between said operative and inoperative positions, whereby said sensing means will respond to the deflection of said jet by said testing element to produce an output signal.

2. A fluid jet deflection-type instrument in accordance with claim 1 wherein said testing element produces a deflection of the jet of predetermined magnitude and direction, and said sensing means produces an output for comparison to a predetermined output obtained by applying the same aforesaid deflection of the jet when said jet is in the centered condition while at rest.

3. A fluid jet deflection-type instrument in accordance with claim 2 in which said testing element comprises an endwise movable plunger.

4. A fluid jet deflection-type instrument in accordance with claim 3 in which said plunger is biased into its inoperative position and is adapted to be moved selectively into its operative position against said bias.

* * * * *

PO-1050
(5/69)

UNITED STATES PATENT OFFICE
CERTIFICATE OF CORRECTION

Patent No. __3,628,371__  Dated __December 21, 1971__

Inventor(s) __A. G. Moore & Schuemann Case 2__

It is certified that error appears in the above-identified patent and that said Letters Patent are hereby corrected as shown below:

Column 1, line 14, after " 1967 " insert -- now Patent No. 3,500,691, dated March 17, 1970 --.

Column 3, line 24, " or " should read -- of --.

Column 4, line 18, between " the chamber " insert -- inlet --.

Column 5, line 16, " 40 to 70 " should read -- 40% to 70% --.

Signed and sealed this 13th day of June 1972.

(SEAL)
Attest:

EDWARD M. FLETCHER, JR.
Attesting Officer

ROBERT GOTTSCHALK
Commissioner of Patents